(12) United States Patent
Voltz (10) Patent No.: US 11,340,889 B2
(45) Date of Patent: May 24, 2022

(54) UPDATING FIRMWARE IMAGES ON CHAINED INPUT/OUTPUT (I/O) MODULES

(71) Applicant: HEWLETT PACKARD ENTERPRISE DEVELOPMENT LP, Houston, TX (US)

(72) Inventor: Christopher D. Voltz, Houston, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 267 days.

(21) Appl. No.: 16/288,933

(22) Filed: Feb. 28, 2019

(65) Prior Publication Data

US 2020/0278858 A1 Sep. 3, 2020

(51) Int. Cl.
*G06F 8/654* (2018.01)
*G06F 9/4401* (2018.01)
*G06F 3/06* (2006.01)

(52) U.S. Cl.
CPC ............ *G06F 8/654* (2018.02); *G06F 3/0632* (2013.01); *G06F 9/4401* (2013.01)

(58) Field of Classification Search
CPC . G06F 3/123; G06F 8/65; G06F 8/654; G06F 9/4401; G06F 13/10; G06F 13/4247; G06F 3/0632
See application file for complete search history.

(56) References Cited

U.S. PATENT DOCUMENTS

| 8,219,794 | B1 | 7/2012 | Wang et al. |
| 8,782,633 | B1* | 7/2014 | Tamilarasan ............ G06F 8/654 |
| | | | 717/173 |
| 9,069,677 | B2 | 6/2015 | Balani et al. |
| 9,798,534 | B1 | 10/2017 | Yi et al. |
| 2010/0138582 | A1* | 6/2010 | Bird ........................ H04L 65/60 |
| | | | 710/303 |
| 2014/0188795 | A1* | 7/2014 | Alewine ............ G06F 11/1658 |
| | | | 707/615 |
| 2016/0124740 | A1 | 5/2016 | Choi et al. |
| 2016/0231939 | A1* | 8/2016 | Cannata ................ G06F 3/0605 |
| 2017/0344356 | A1* | 11/2017 | Yen ..................... G06F 13/4282 |
| 2018/0285087 | A1* | 10/2018 | Lusk ..................... H04L 41/082 |
| 2018/0357019 | A1* | 12/2018 | Karr ........................ G06F 3/061 |
| 2019/0065093 | A1* | 2/2019 | Karr ...................... G06F 3/0649 |
| 2019/0171601 | A1* | 6/2019 | Nachimuthu ....... G06F 9/45558 |

OTHER PUBLICATIONS

"Cisco UCS M-Series GUI Firmware Management Guide." Release 2.5. Cisco Systems, Inc. Aug. 21, 2015. (Year: 2015).*

(Continued)

*Primary Examiner* — Thomas J. Cleary
(74) *Attorney, Agent, or Firm* — Trop, Pruner & Hu, P.C.

(57) ABSTRACT

A technique includes communicating with a plurality of input/output (I/O) modules to cause a firmware image to be transferred to the I/O modules. The I/O modules are each associated with the plurality of storage device enclosures, and the I/O modules are serially coupled together in a chain establishing a processing order among the I/O modules. The technique includes rebooting the I/O modules to cause the I/O modules to use the communicated firmware images, where the rebooting includes rebooting the I/O modules in a second order counter to the processing order.

20 Claims, 6 Drawing Sheets

(56) References Cited

OTHER PUBLICATIONS

Cisco, "Cisco UCS B-series GUI Firmware Management Guide", Release 2.2—"Directly Upgrading Firmware at Endpoints", Release 2.2, Retrieved from the Internet on Oct. 11, 2018 at URL: <cisco.com/c/en/us/td/docs/unified_computing/ucs/sw/firmware-mgmt/gui/2-2/b_GUI_Firmware_Management_22/b_GUI_Firmware_Management_22_chapter_0110.html>, Mar. 5, 2018, pp. 1-19 (online).
Honeywell, Experian PKS, "Control Hardware and IO Modules Firmware Upgrade Guide," EPDOC-X150-en-500C, Release 500, May 8, 2018, pp. 1-56.

* cited by examiner

UPDATING FIRMWARE IMAGES ON CHAINED INPUT/OUTPUT (I/O) MODULES

BACKGROUND

One way to locally connect a server to a group of storage devices is to connect the server to a collection of disk drives that are contained in a storage drive enclosure. For example, the group of storage drives may be drives in a drawer of a Just a Bunch of Disks (JBOD) storage drive enclosure. More specifically, a host bus adapter (HBA), such as a Serial Attached SCSI (SAS) card, may provide a port connector to physically couple the server to a drawer of the storage drive enclosure using a cable (a SAS cable, for example). More specifically, the SAS cable may connect a port of the HBA to a corresponding port of an input/output module (IOM) of the drawer. In general, the IOM serves as a port expander, which allows one port of the HBA to address the ports of multiple storage drives of the drawer. To further expand the storage drives that may be accessed through the port of the HBA, multiple IOMs (corresponding to other drawers of the JBOD storage drive enclosure) may be connected together in a daisy chain by SAS cables.

DETAILED DESCRIPTION

An HBA may be locally connected to a set of cascaded, or daisy chained, groups of storage drives. For example, a Just a Bunch of Disks (JBOD) storage drive enclosure may include multiple drawers, and each drawer may contain multiple slots, or bays, where each bay contains a storage drive. Each drawer may contain an associated input/output (I/O) module (IOM), and the IOMs from multiple JBOD drawers (e.g., drawers from different JBOD storage drive enclosures) may be daisy chained together to increase the number of storage drives that may be accessed through a given port of the HBA.

For example, one end of a SAS cable may be connected to a port connector of the HBA; the other end the SAS cable may be connected to a port connector of a first IOM of the daisy chain; and SAS cables may extend between port connectors of other IOMs of the daisy chain.

The order in which the IOMs are daisy chained together establishes a certain processing order for command descriptor blocks (CDBs) that are issued through the HBA port. In this manner, the IOM that is closest (in terms of the number of SAS cables) to the HBA port is the first IOM of the chain, the next closest IOM to the HBA port is the second IOM of the chain, and so forth. The daisy chaining, in general, constrains the updating of firmware in the IOMs, as further described herein.

In the context of this application, an IOM, which may alternatively be referred to by such names as an "I/O processor," "IOP," or "I/O controller," allows one port of the HBA to address the ports of multiple storage drives in a storage drive enclosure. As a more specific example, an IOM may be associated with a particular SAS port, and the SAS port may be specified by a particular SAS address. The SAS address may also identify a specific storage drive port. More specifically, a SAS port may be associated with multiple physical links (PHYs), which is the case for a wide SAS port, or a single PHY, which is the case for a narrow SAS port. A given PHY may correspond to a particular storage drive.

A SCSI CDB for a particular target, such as a storage drive, may specify a command and an address of the storage drive. For example, the storage drive may be associated with a specific logical unit number (LUN), and the CDB may specify a command and an address for the LUN. The target storage drive may be addressed in several different ways, such as through the following format: Host:Controller:Target:LUN. As an example, with SAS, the target port address may be specified with the Network Address Authority (NAA)=5 address, and in Linux, the target port address may be specified with a major and minor number. A given target may have multiple SAS address components: an address for each port for each domain, a baseline address evenly divisible by four and a LUN identifying component.

The initiator may maintain a map of storage devices that are associated with a given SAS port, so that the initiator sends the command to the appropriate SAS port. The IOM associated with the SAS port contains a port expander that routes the command to the device port of the target storage drive.

A given CDB that is issued by the HBA port may be passed along a daisy chain of IOMs, from one IOM to the next, according to the processing order that is established by the daisy chain, until the CDB reaches the IOM that corresponds to SAS port of the command.

Occasionally, the firmware of the IOMs, which may be stored in non-volatile memory (such as a flash memory, for example) of the IOMs may be updated in a process generally referred to as "firmware flashing," "firmware image flashing," or "firmware updating" (although the firmware instructions may or may not be actually stored in a flash memory). The firmware image may be stored in non-volatile memory (NVM), which may be in a controller, or hardware processor, of the IOM; or in accordance with further example implementations, the firmware image may be stored in a separate NVM of the IOM. The firmware image is available when the IOM is powered on. The hardware processor of the IOM may execute the firmware image directly from an NVM, or the hardware processor may copy the instructions to volatile memory (e.g., a dynamic random access memory (DRAM)) to execute from. This latter approach of executing from a volatile memory may be used, for example, when the firmware image is compressed or encrypted. In either case, in accordance with example implementations, there is at least some bootstrap code in the NVM.

In accordance with example implementations, the firmware of the IOM controls operation of a hardware processor of the IOM and may, for example, control the hardware processor's setup and address mapping applied by a port expander of the IOM (control the mappings of SAS addresses that specify specific LUNs to corresponding storage drives, for example).

In general, to flash, or update, the firmware image of a given IOM (herein referred to as "firmware," "firmware image," an "IOM firmware image" or "IOM firmware"), an updated firmware image is loaded into a memory of the IOM (via a SCSI open command to open a connection to the hardware processor of the IOM followed by a SCSI write command to write the firmware image to the NVM for the hardware processor, for example), and the hardware processor of the IOM is then rebooted (via another SCSI command, for example) for purposes of causing the new, or updated, firmware image to take effect in the IOM.

Updating the IOM firmware for a set of cascaded, or daisy chained, IOMs is constrained by the nature in which the HBA communicates with the IOMs. One way to update the firmware of IOMs that are daisy chained together is to update the IOM firmware according to the processing order that is established by the daisy chain. In this manner, each IOM may be updated with new firmware via a SCSI write and then rebooted (to affect the firmware update) in a serial fashion according to the processing order that is established by the daisy chain. However, each time an IOM is rebooted, the IOMs of the daisy chain that are located further away from the HBA port are effectively removed.

Updating the firmware in this manner may incur a significant amount of time, in that the overall time incurs both delays that are attributable to processing the removal of all of the storage drives and storage drive enclosures downstream of the IOM being updated, as well as delays that are attributable to processing the addition of all the drives and enclosures downstream of each IOM that was just updated. For small JBOD enclosures, the amount of time may be relatively small, but as the number of disks in the JBOD increases and the number of JBODs increases, the amount of time to process them increases (and the increase in delay may not be linear). In addition, if the JBOD has redundant IOMs, the HBA has multiple paths (to provide cable redundancy) and the node has redundant HBAs (to provide controller redundancy), the number of devices to be processed significantly increases.

As a more specific example, a system that includes six JBOD storage drive enclosures may have two HBAs (corresponding to high availability (HA) nodes) attached, and each HBA may have four ports. Each JBOD storage drive enclosure may have two drawers, each drawer may have its own IOM, and each drawer may have thirty-five storage drives. To provide redundancy, each drawer may have two IOMs (to provide both IOM redundancy) and each IOM may have two ports (to provide cable redundancy). With six fully populated JBOD storage drive enclosures that are attached to the system, there are twenty-four IOMs (providing forty-eight ports) and 420 drives attached to the system. Two ports of each HBA are used to connect to the start and end of a daisy chain (to provide cable redundancy) of three drawers. In this case, the redundant IOMs are used to provide connectivity to the other HA node. Thus, the eight ports of the two HBAs on a single node are broken into four different daisy chains.

For the above-example system, due to multipathing, the operating system (OS) sees all 420 drives and twelve IOMs (via twenty-four ports) as 840 drives and twenty-four IOMs in eight groups of three IOMs. When flashing the first IOM of the chain, the OS sees the removal and addition of three IOMs and 105 drives from the one port of the HBA and the removal and addition of one IOM and thirty-five storage drives from the other port of the HBA. When the OS flashes the second IOM of the same chain, the OS sees the removal and addition of two IOMs and seventy drives from one port of the HBA and the removal and addition of two IOMs and seventy storage drives from the other port of the HBA. When the OS flashes the third IOM of the same chain, the OS sees the removal and addition of one IOM and thirty-five drives from one port of the HBA and the removal and addition of three IOMs and 105 drives from the other port of the HBA. Thus, for each IOM which is flashed, the OS processes the removal and addition of four IOMs and 140 storage drives. With eight groups of three IOMs, this process would naively be repeated twenty-four times so that the OS sees the removal and the addition of a total of ninety-six IOMs and 3360 storage drives. As such, upgrading the firmware in the above-described manner consumes a considerably long time, especially considering that the drive spin-up time alone is 30 seconds, adding a storage device generates multiple udev events and there are a limited number of udev processes.

In accordance with example implementations that are described herein, the rebooting of IOMs is controlled in a manner that allows the firmware flashing process to be performed in a relatively shorter time. More specifically, in accordance with example implementations, rebooting of the IOMs (as part of the firmware flashing) is deferred until the updated firmware image data has been transferred to all of the IOMs of the daisy chain, and then, the IOMs are rebooted in a sequence that is reversed, relative to the processing order that is established by the daisy chain. In other words, in accordance with example implementations, after the updated firmware is loaded, or transferred to all of the IOMs of the chain, the IOMs are rebooted as follows: the last IOM of the daisy chain (i.e., the IOM that is farthest from the HBA port) is rebooted first, the next-to-last IOM of the daisy chain is rebooted next, and so forth, until the first IOM of the daisy chain (i.e., the IOM closest to the HBA port) is rebooted last. By rebooting the IOMs in this reverse order, IOMs that are closer to the HBA port may be sent commands to reboot while the IOMs that are farther from the HBA port are rebooting, which allows a more time efficient flashing of the firmware.

Figure 1:
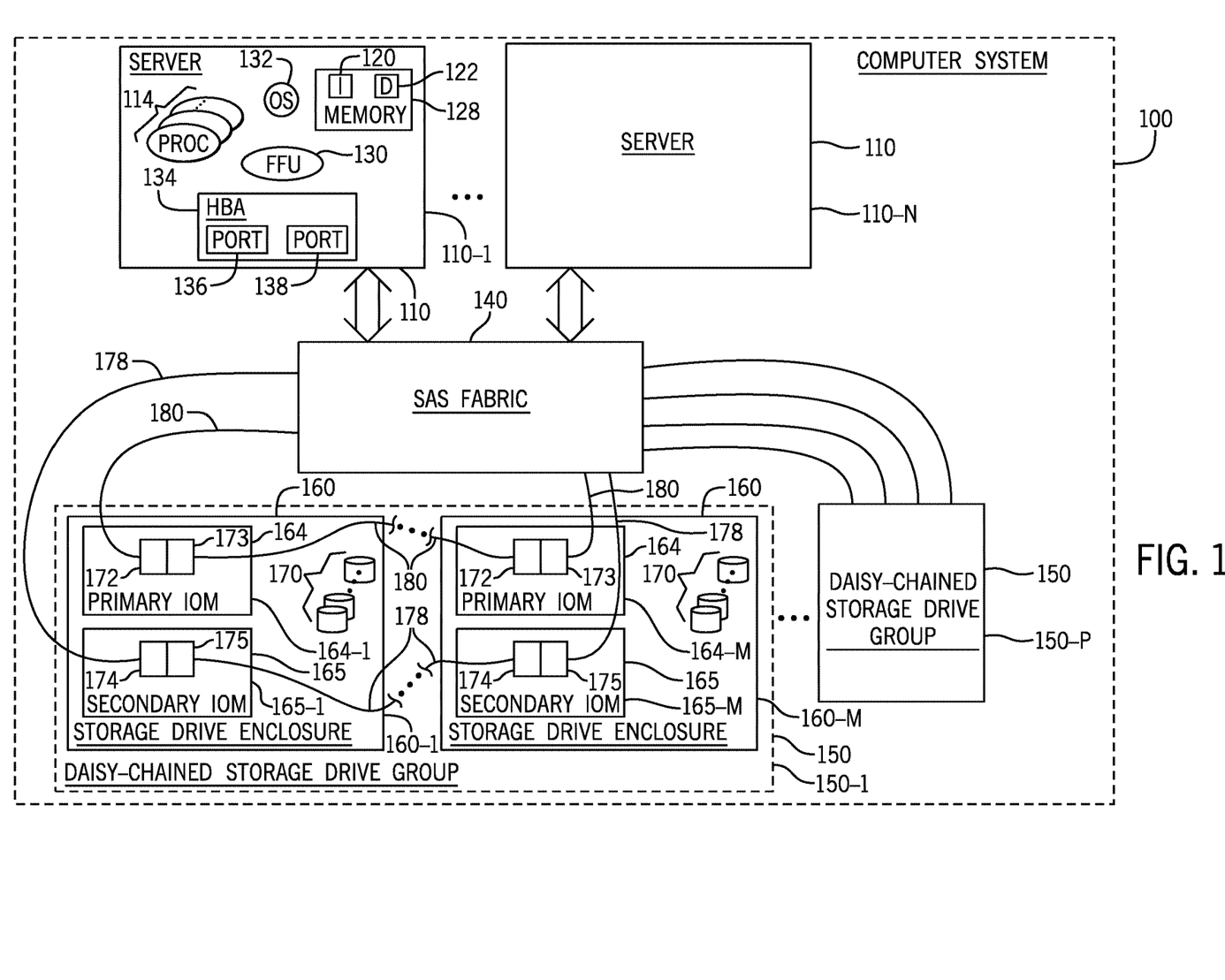
FIG. 1 is a schematic diagram of a computer system according to an example implementation.

As a more specific example, referring to FIG. 1, a computer system 100 may include one or multiple servers 110 (N example servers 110-1, . . . , 110-N being illustrated in FIG. 1), which are coupled by SAS fabric 140 to one or multiple daisy chained storage drive groups 150 (P example daisy chained storage drive groups 150-1, . . . , 150-P, being illustrated in FIG. 1).

The computer system 100 may take on numerous forms, depending on the particular implementation. For example, the computer system 100 of FIG. 1 is a cluster that includes multiple servers 110. As another example, in accordance with further implementations, the servers 100 may be replaced with processing nodes that collectively form a server.

In the context of this application, a "daisy chained storage drive group" refers to a set of cascaded storage drive collections, such that cabling may extend between the storage drive enclosures of a given group to connect the storage drive enclosures together serially, in a manner often referred to as "daisy chaining."

As a more specific example, in accordance with some implementations, a daisy chained storage drive group 150 may correspond to boxes, or drawers (each with its own IOM), of multiple JBOD storage drive enclosures. More specifically, in accordance with example implementations, a JBOD storage drive enclosure may include multiple drawers, or boxes; each drawer may contain multiple slots, or bays, where each bay contains a storage drive 170; and each drawer of the JBOD storage drive enclosure forms a storage drive enclosure 160. FIG. 1 illustrates P daisy chained storage drive groups 150-1, . . . , 150-P (e.g., daisy chained storage drive groups formed from drawers from multiple JBOD storage drive enclosures); and a given storage drive group 150 (such as illustrated storage drive group 150-1) contains M storage drive enclosures 160-1, . . . , 160-M (e.g., corresponding JBOD storage drive enclosure drawers) whose IOMs are daisy chained together.

In accordance with further example implementations, the techniques that are described herein may be applied to update firmware in daisy chained groups of IOMs, where the IOMs do not correspond to storage drive enclosure drawers. For example, in accordance with further example implementations, the IOMs corresponding to entire JBOD storage drive enclosures may be daisy chained together, the IOMs correspond in to groupings of JBOD storage drive enclosure drawers maybe daisy chained together, and so forth.

The firmware for IOMs for storage drive enclosures, other than daisy chained JBOD storage drive enclosure drawers, may be updated, or flashed, using the techniques that are described herein, in accordance with further implementations.

For the example implementation that is depicted in FIG. 1, the server 110-1 may communicate with the storage drive group 150-1 occur over a particular SAS cable 178 or 180 that is connected to the storage drive group 150-1; and depending on the particular implementation, the SAS cables may be directly connected to a host bus adapter (HBA) 134, such as a Serial Attached SCSI, or SAS, expansion card, or may be connected to SAS fabric 140 (as depicted in FIG. 1), which are in communication with the HBA 134.

More specifically, to communicate with the daisy chained storage drive group 150-1, the server 110-1 may use a port 136 of the HBA 134. In relation to the storage drive group 150-1, the HBA 134 may use a port 136 to communicate with the storage drive group 150-1. In this manner, the HBA 134 may issue SCSI CDBs through the port 136, which contain SAS addresses that target certain storage drives 170. Each storage drive enclosure 160, in turn, includes one or multiple IOMs, which facilitate connections to the storage drives 170 of the enclosure 160.

In general, the IOM serves as a port expander which allows one port of the HBA 134 to address the ports of multiple storage drives 170 of the storage drive enclosure 160.

For the specific example implementation of FIG. 1, the storage drive enclosure 160 contains a pair of IOMs: a primary IOM 164 and a secondary IOM 165. In accordance with further example implementations, the storage drive enclosure 160 may contain a single IOM or more than two IOMs. Thus, many implementations are contemplated, which are within the scope of the appended claims.

For a given storage drive group 150, such as the storage drive group 150-1, IOMs of the storage drive enclosures 160 (e.g., drawers of multiple JBOD storage drive enclosures) of the group 150 are serially connected together in a daisy chain. With this configuration, commands that are issued through the HBA port 136 (for this example) propagate through the IOMs of the storage drive group 150 in a certain processing order that is defined by the order in which the IOMs are daisy chained together.

More specifically, in accordance with example implementations, the IOMs of the storage drive enclosures 160 may be connected together in a daisy chain by SAS cables 180. The IOM 164-1 of the storage drive enclosure 160-1, for this example, is the IOM of the first storage drive group 160-1 of the chain, and as such, all CDBs that are issued through the HBA port 136 propagate first to the IOM 164-1 of the storage drive enclosure 160-1. A particular CDB includes a SAS address, which may target one of the storage drives 170 of the storage drive group 150-1. However, regardless of the SAS address, the CDB first propagates first through the IOM 164-1 of the storage drive group 160-1, and if the CDB does not contain a SAS address that targets one of the storage drives 170 that is associated with the IOM 164-1, then the IOM 164-1 forwards, or propagates, the CDB to the next IOM 164-2 in the chain. Thus, for example, if the SAS address targets a storage drive 170 that corresponds to the IOM 164-M of the storage drive enclosure 160-M, then the CDB propagates through all of the other IOMs 164 that are closer to the port 136 before arriving at the last IOM 164-M.

In accordance with example implementations, the IOM 164 has two port connectors: a first port connector 172 and a second port connector 173. As depicted in FIG. 1, for failover purposes, the 173 of the IOM 164-M, the last IOM 164 of the chain, may be connected to another port 138 of the HBA 134. In this manner, for failover purposes, the ports 136 and 138 may be juxtaposed, which reverses the daisy chain processing order for the drive group 150-1.

As also depicted in FIG. 1, in accordance with example implementations, the storage drive enclosures 160 may each include more than one IOM. In this manner, FIG. 1 depicts an example implementation in which the storage drive enclosure 160 includes a pair of IOMs: the above-described IOM 164, which may be, for example, the primary IOM for the storage drive enclosure 160; and another IOM 165, which may be, for example, the secondary, or backup, IOM for the storage enclosure 160.

With multiple IOMs, a given daisy chained storage drive group 150 may be associated with multiple chains of drive enclosures 160. For the specific example implementation that is depicted in FIG. 1, the primary IOMs 164 of the storage drive group 150-1 are daisy chained together by cables 180 (SAS cables, for example), and the secondary IOMs 165 of the storage drive group 150-1 are daisy chained together by cables 178 (SAS cables, for example).

Through the use of the SAS fabric 140, which may include, for example, SAS switches, the servers 110 may share daisy chained storage drive groups 150. For example, multiple servers 110 may form a high availability (HA) cluster of servers that share one or multiple daisy chained storage drive groups 150.

In accordance with example implementations, the server 110 is an actual physical machine made up of actual hardware and actual machine executable instructions (or "software"). In this manner, using server 110-1 as an example, the server 110-1 may include one or multiple processors 114 (one or multiple CPUs, one or multiple CPU processing cores, and so forth), one or multiple HBAs 134, and a memory 128. In general, the processor(s) 114 may execute instructions 120 that are stored in the memory 128 for purposes of forming one or multiple components of the server 110-1, such as, for example, an operating system 132, a firmware flashing utility (FFU) 130, which is used to update firmware images of the IOMs (as further described herein); and so forth. In general, the memory 128 is a non-transitory memory that may be formed from storage devices that are associated with one or multiple storage technologies, such as semiconductor device-based storage devices, phase change memory-based storage devices, magnetic material-based storage devices, memristor-based storage devices, storage devices pertaining to other storage technologies, and so forth.

In addition to the instructions 120, the memory 128 may store data 122, such as data pertaining to the firmware flash utility 130, such as firmware image data, data representing IOMs of a given group 150, which have been rebooted (as further described herein), and so forth.

Although the components of the server 110-1 are depicted in FIG. 1 as being contained in a box (or rack), in accordance with further example implementations, the components may be located in multiple boxes (or racks). Additionally, in accordance with some implementations, although the server 110-1 is a physical machine, one or multiple components of the server 110-1 may be virtual components, such as virtual machines. In accordance with further example implementations, one or multiple components of the server 110-1 may be formed from processors, or hardware circuits, which do not execute machine executable instructions. In this regard, in accordance with some implementations, one or more components of the server 110-1 may be formed from hardware circuits, such as field programmable gate arrays (FPGAs), application specific integrated circuits (ASICs), and so forth.

In accordance with example implementations, the firmware flashing utility 130 may update the firmware for the IOMs of a given daisy chained storage drive group 150, i.e., may re-flash the IOMs, using a flashing technique in which the IOMs are rebooted in a sequence that reduces the overall firmware update time. More specifically, in accordance with some implementations, as further described herein, the firmware flashing utility 130 first uploads the updated, or new, firmware image to all of the IOMs being updated before rebooting any of the IOMs of the storage drive group 150. It is noted that rebooting a given IOM causes the re-flashing to take effect, i.e., causes the IOM to use the newly-loaded firmware image in place of the old firmware image. After loading the new firmware images into all of the IOMs of the storage drive group 150, in accordance with example implementations, the firmware flashing utility 130 then reboots the IOMs in the storage drive group 150 in an order that is in reverse, or counter to, the processing order of the daisy chain. More specifically, in accordance with example implementations, the firmware flashing utility 130 reboots the last IOM of the chain first, reboots the next-to-last IOM of the chain next, and so forth, until the first IOM of the chain is rebooted last. By rebooting the IOMs in the above-described reverse order, upstream IOMs may be sent commands to reboot while one or multiple downstream IOMs is/are already rebooting. The result is that the storage drives 170 (and corresponding storage drive enclosures 160) are "removed" from the computer system 100 a single time in the flashing process, which reduces the overall time to update new, or updated, IOM firmware. In general, the rebooting of one IOM of the daisy chain may cause communication with one or multiple other IOMs of the daisy chain to be unavailable.

Moreover, in accordance with example implementations, as further described herein, the firmware flashing utility 130 takes into account the potential scenario that multiple servers 110 may be, within the same concurrent time frame, attempting to update the IOMs of the same storage drive group 150. For example, when an HA server cluster is being updated with a service pack, this service update may cause the servers 110 in the HA cluster to simultaneously perform firmware updates of the IOMs. When the flash utility runs, the utility checks the existing version of firmware to determine if the IOM is to be updated or not. If not, the flash utility skips the IOM; and if the IOM firmware is to be updated, the flash utility attempts to update the firmware.

Figure 2:
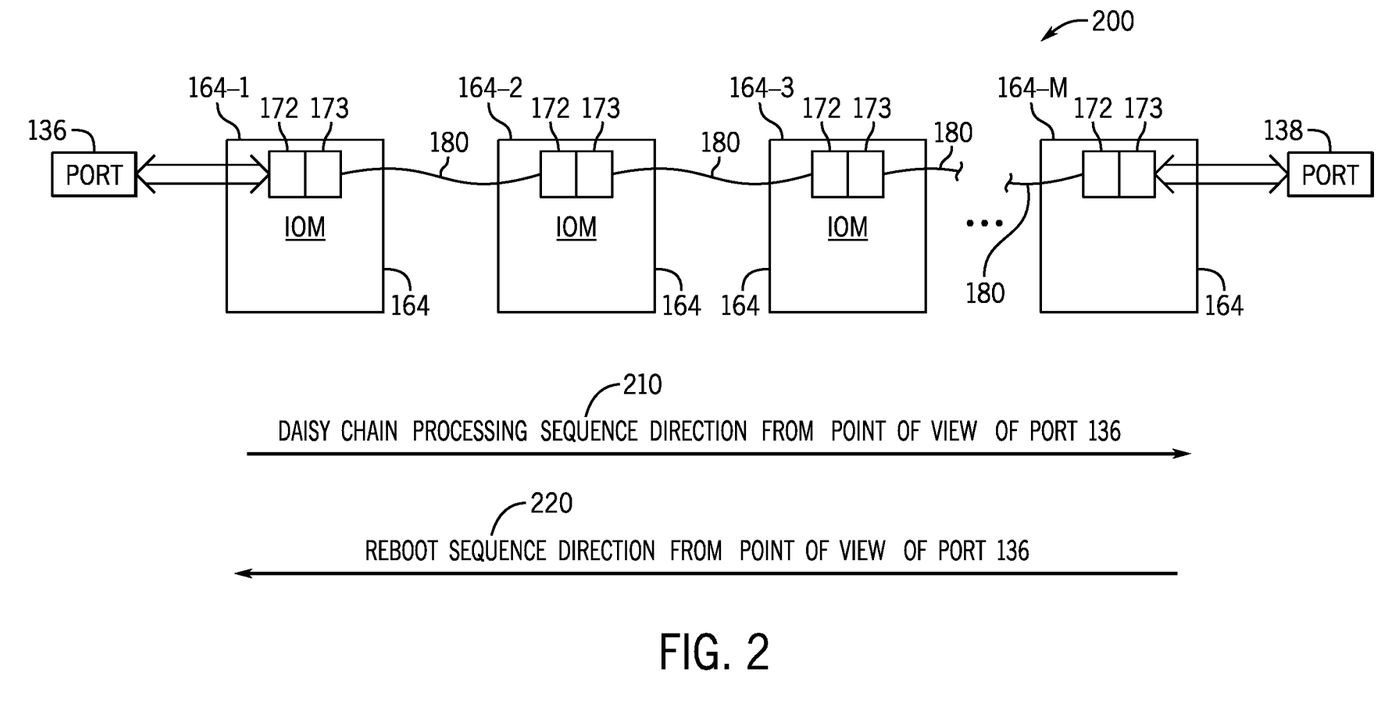
FIG. 2 is an illustration of an order associated with rebooting input/output modules (IOMs) of storage drive enclosures in association with a firmware image update according to an example implementation.

FIG. 2 depicts an illustration 200 showing a process of updating the IOM firmware of the daisy chained storage drive group 150-1, from the point of view of the port 136. As depicted in FIG. 2, the storage drive group 150-1 is associated with a daisy chaining processing order direction 210 from the point of view of the port 136, in that SCSI commands may, for example, propagate through the chain from the port 136 in the direction 210. However, for purposes of rebooting the IOMs 164 to effect firmware updates, in accordance with example implementations, the firmware flashing utility 130 performs the rebooting in the reverse direction 220 from the point of view of the port 136, i.e., begins the rebooting with the IOM 164-M and proceeds with the sequential rebooting in the direction 220 until the last IOM 164-1 is rebooted.

Figure 3:
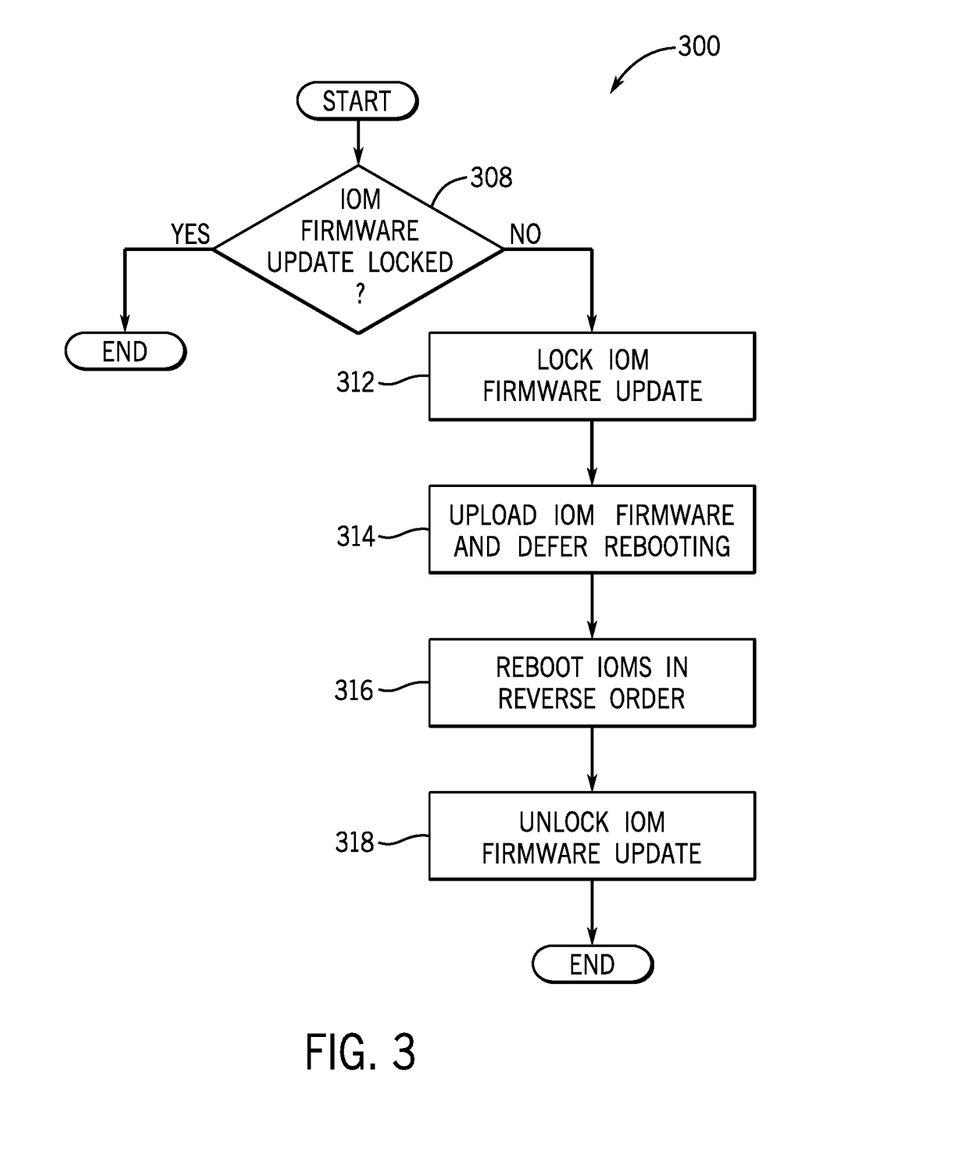
FIG. 3 is a flow diagram of a technique performed by a firmware flashing utility according to an example implementation.

Referring to FIG. 3 in conjunction with FIG. 1, in accordance with some implementations, the firmware flashing utility 130 may perform a technique 300 for purposes of updating the IOM firmware. Pursuant to the technique 300, the firmware flashing utility 130 determines (block 308) whether the IOM firmware update has been locked, and if so, the technique 300 terminates the update process for that IOM. If, pursuant to decision block 308, a determination is made that the IOM firmware update has not been locked, then the firmware flashing utility 130 locks the IOM firmware update, pursuant to block 312. In accordance with some implementations, the firmware flashing utility 130 may lock all of the IOMs in the chain for purposes of preventing one node from updating one IOM in the chain while another node is updating another IOM in the same chain. Next, pursuant to the technique 300, the firmware flashing utility 130 uploads the IOM firmware and defers rebooting, pursuant to block 314. As a more specific example, in accordance with some implementations, for a Linux operating system, the firmware flashing utility 130 may open connections to the hardware processors of the IOMs of the chain and send an SG_WRITE_BUFFER command using mode 14 to the IOMs of the chain in parallel. The SG_WRITE_BUFFER command, using mode 14, causes the new firmware image to be uploaded to the IOMs while instructing the IOMs to defer rebooting.

If, however, pursuant to decision block 308, the firmware flashing utility 130 then proceeds to reboot (block 316) the IOMs in reverse order. In this manner, the firmware flashing utility 130 communicates with the IOMs to reboot the IOMs in the reverse order relative to the processing order of the daisy chaining. In accordance with some implementations, for a Linux operating system, the firmware flashing utility 130, pursuant to the reverse order, sequentially opens a connection and communicates the SG_WRITE_BUFFER command (using mode 15) to each of the detected IOMs to cause the IOMs to reboot. The firmware flashing utility 130 then unlocks the IOM firmware update, pursuant to block 318.

In accordance with some implementations, the locking of the IOM may be accomplished using one or multiple bits of the IOM, which are readable and controllable by the flash utility 130. Moreover, in accordance with some implementations, as discussed herein, the entire daisy chain of IOMs may be locked, and one or multiple bits in the memory (an IOM memory, for example) may be used to set the lock/unlock status for the chain.

Figure 4:
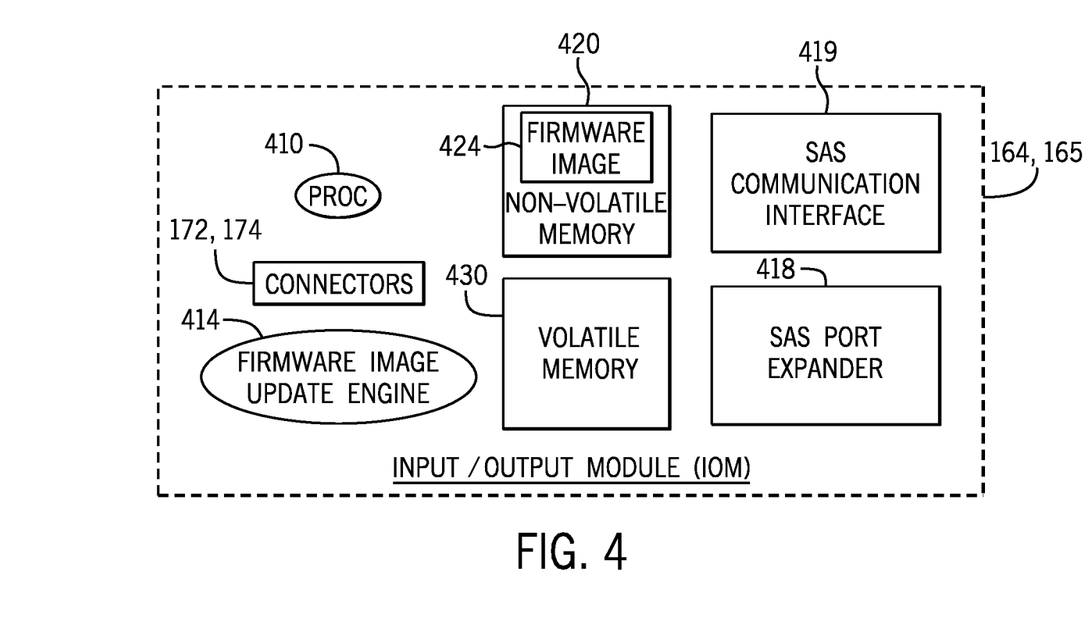
FIG. 4 is a schematic diagram of an IOM according to an example implementation.

Referring to FIG. 4, in accordance with some implementations, the IOM 164, 165 may include a SAS port expander 418 and a SAS communication interface 419 (to communicate with the incoming port connectors 172 and 174). Moreover, the IOM 164, 165 may include one or multiple processors 410 and may include a non-volatile memory 420 that stores a firmware image 424. In accordance with some implementations, there may be more than one firmware image. For example, in accordance with example implementations, there may be a previous firmware image and a current (updated) firmware image, which allows a user to select between the two firmware images in case there is a problem with the new firmware image. In accordance with some implementations, a given processor 410 of the IOM 164, 165 may program the SAS port expander 418 to map SAS addresses to ports.

For purposes of updating a firmware image 424, the IOM may perform a number of different techniques. For example, in accordance with some implementations, the new firmware image 424 is transferred from SAS into the volatile memory 430 and then the processor 410 flashes the non-volatile memory 420 and reboots the IOM to use the new firmware. This allows checks to be performed on the firmware image 424 before the non-volatile memory 420 is updated. In another technique, the firmware image 424 may be transferred from SAS directly into the non-volatile memory 420, and then the IOM may be rebooted to use the new firmware.

As also depicted in FIG. 4, in accordance with example implementations, the IOM may include a firmware image update engine 414 that performs the above-described process of updating the firmware and effecting the update upon reboot. Moreover, in accordance with some implementations, the firmware image update engine 414 may be provided by the processor 410 executing machine executable instructions that are stored in the IOM, such as instructions that are stored in the firmware image 424.

Figure 5:
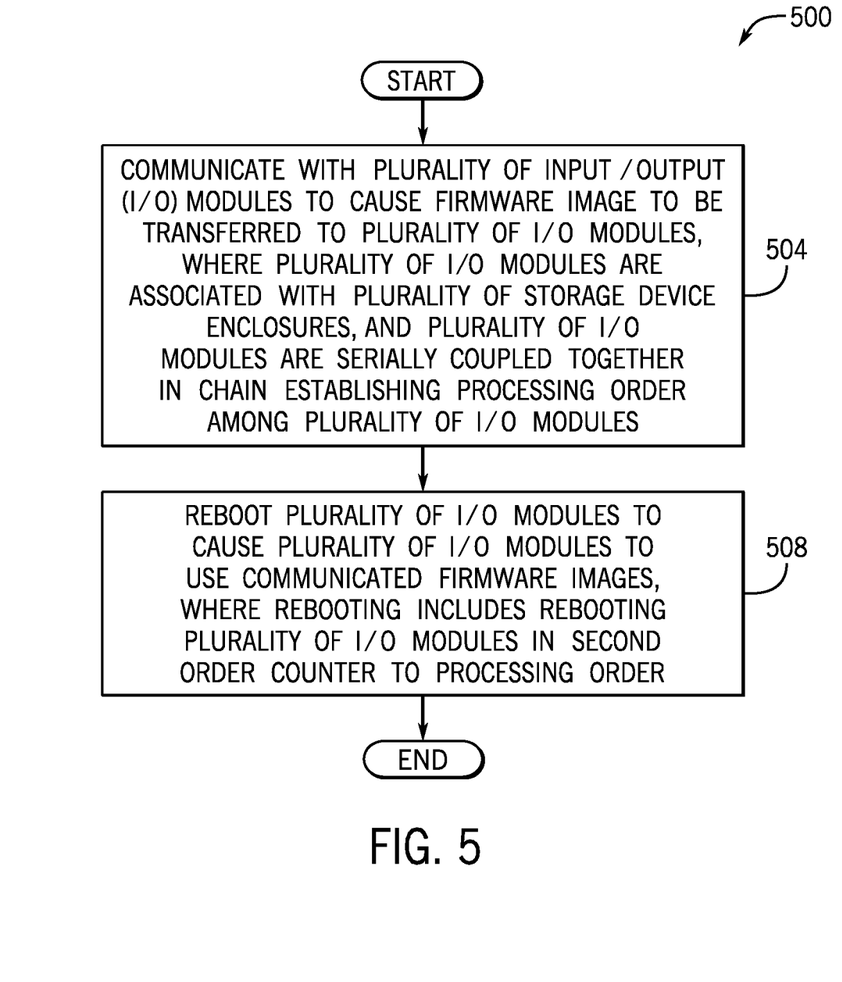
FIG. 5 is a flow diagram depicting a technique to update a firmware image in IOMs that are serially coupled together in a chain according to an example implementation.

In accordance with example implementations, a technique 500 that is depicted in FIG. 5 includes communicating (block 404) with a plurality of input/output (I/O) modules called a firmware image to be transferred to the I/O modules. The I/O modules are each associated with the plurality of storage device enclosures, and the I/O modules are serially coupled together in a chain establishing a processing order among the I/O modules. The technique 500 includes rebooting (block 508) the I/O modules to cause the I/O modules to use the communicated firmware images, where the rebooting includes rebooting the I/O modules in a second order counter to the processing order.

Figure 6:
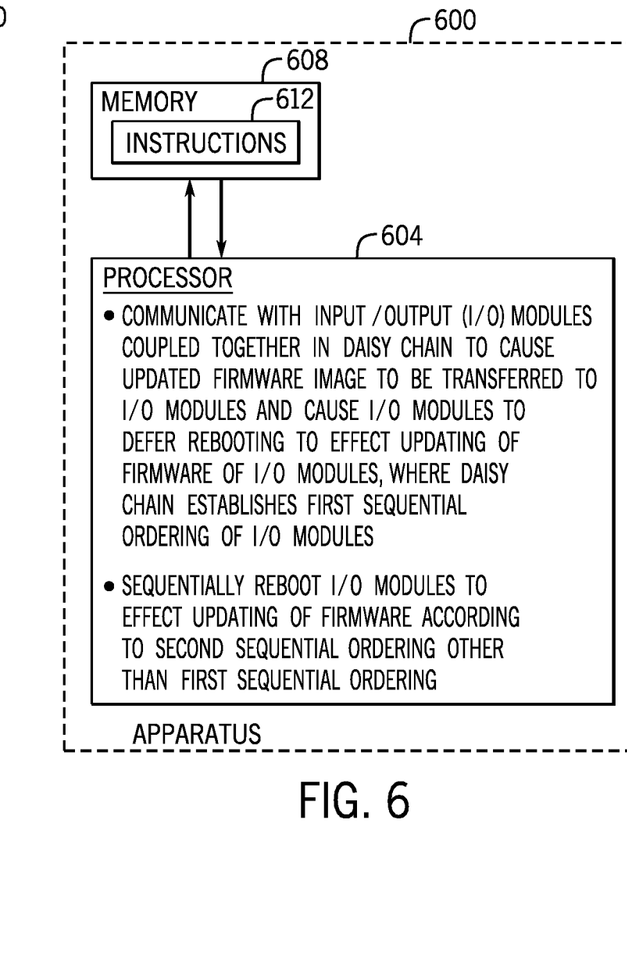
FIG. 6 is a schematic diagram of an apparatus to update firmware images in a daisy chain of IOMs according to an example implementation.

Referring to FIG. 6, in accordance with example implementations, an apparatus 600 includes at least one processor 604 and a memory 608. The memory 608 stores instructions 612 that, when executed by the processor(s) 604, cause the processor(s) 604 to communicate with input/output (I/O) modules that are coupled together in a daisy chain to cause an updated firmware image to be transferred to the I/O modules and cause the I/O modules to defer rebooting to effect updating of firmware of the I/O modules. The daisy chain establishes a first sequential ordering of the I/O modules. The instructions 612, when executed by the processor(s) 604, cause the processor(s) 604 to sequentially reboot the I/O modules to effect updating of the firmware according to a second sequential ordering other than the first sequential ordering.

Figure 7:
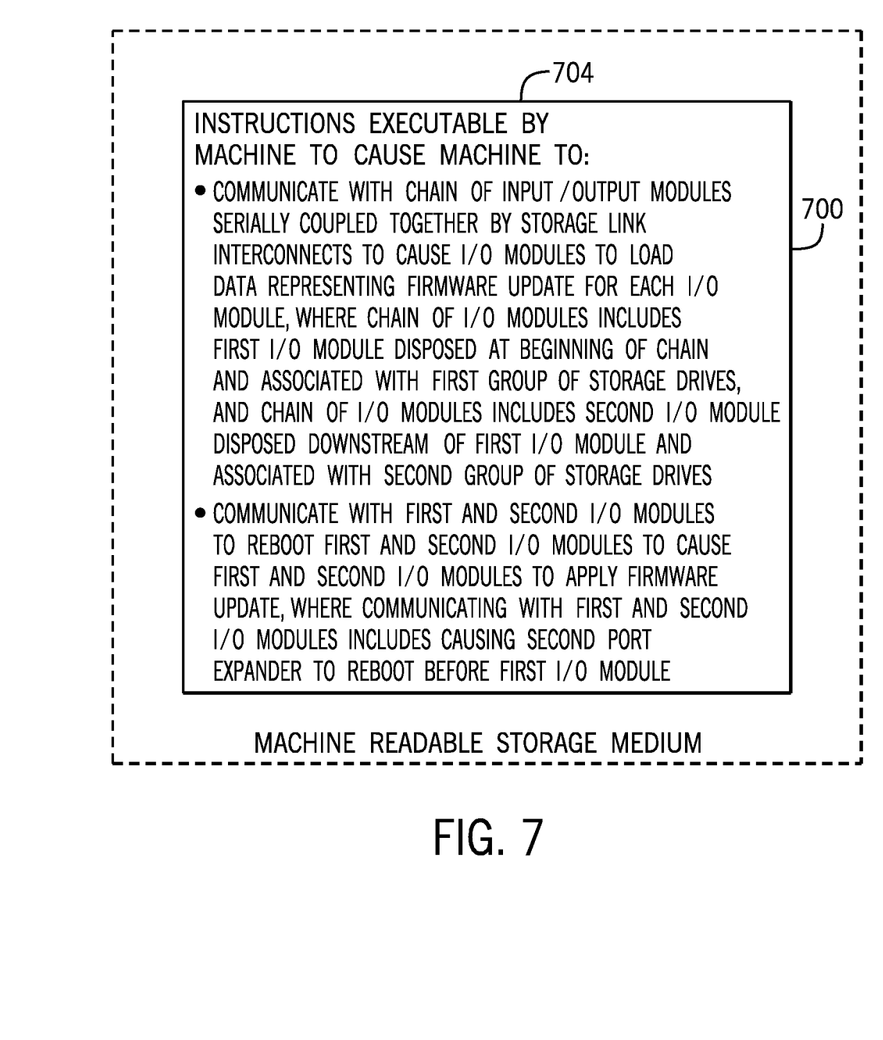
FIG. 7 is an illustration of a machine readable storage medium storing instructions to cause a machine to update firmware in a chain of serially coupled IOMs according to an example implementation.

Referring to FIG. 7, in accordance with example implementations, a machine readable storage medium 700 stores instructions 704 that, when executed by a machine, cause the machine to communicate with a chain of input/output (I/O) modules that are serially coupled together by storage link interconnects to cause the I/O modules to load data representing a firmware update for each of the I/O modules. The chain of I/O modules includes a first I/O module that is disposed at the beginning of the chain and associated with a first group of storage drives, and the chain of I/O modules includes a second I/O module that is disposed downstream of the first I/O module and is associated with a second group of storage drives. The instructions 704, when executed by the machine, cause the machine to communicate with the first and second I/O modules to cause the second I/O module to reboot before the first I/O module to cause the first and second I/O modules to be initialized with the firmware update.

In accordance with example implementations, the techniques and systems that are described herein, may have one or more of the following features and corresponding advantages. The chain in which the plurality of IOMs are serially coupled may be a daisy chain that begins with a first IOM and ends with a second IOM, and rebooting the IOMs in a second order counter to the processing order may include rebooting the second IOM before rebooting the first IOM. A particular advantage of this technique is that the first IOM may be sent a command to reboot while downstream IOMs, such as the second IOM is rebooting, thereby saving time in flashing the chain of IOMs.

In accordance with some implementations, the processing order among the IOMs corresponds to a first sequential direction along the chain, the second order corresponds to a second sequential direction along the chain, and rebooting the plurality of IOMs includes communicating a command to reboot a first IOM while a second IOM of the IOMs is rebooting. This, in turn, may be a more efficient way to flash the IOMs.

In accordance with some implementations, a given IOM may include a port expander to communicate with a plurality of ports associated with a plurality of storage devices. This, in turn, may allow efficient use of SAS fabric to communicate with a large number of storage drives.

In accordance with some implementations, communicating the firmware image to the IOMs includes communicating the firmware image data through a port of a host bus adapter, thereby allowing the techniques and systems that are described herein to be used in conjunction with a host bus adapter, such as a SAS card of a server, to flash IOMs in a time efficient manner.

In accordance with some implementations, a first IOM may correspond to a first end of the chain and be coupled to a first port of a host bus adapter, and a second IOM of the chain may be coupled to a second port of the host bus adapter other than the first port. This arrangement allows a failover so that the chain may be accessed from either end.

In accordance with some implementations, communicating with the plurality of IOMs comprises communicating with hardware processors of the IOMs. This arrangement allows a more efficient way to flash firmware used by the hardware processors.

In accordance with some implementations, communicating the firmware images and the rebooting occur in association with a first computing node and determining whether the chain is locked from firmware updates includes determining, by the first computing node, whether a second computing node is in a process of updating firmware that is associated with the IOMs. This prevents concurrent or near concurrent potential firmware updates being performed by a cluster of HA computing nodes. In accordance with some implementations, the determination may involve determining whether a particular IOM of the chain is locked.

In accordance with example implementations, communicating the firmware image data to the IOMs includes communicating a write command to the plurality of IOMs, where the write command causes the plurality of IOMs to defer rebooting. The deferring of rebooting, in turn, allows the sequencing of the rebooting, as described herein, for purposes of flashing the IOMs in a more time efficient manner.

While the present disclosure has been described with respect to a limited number of implementations, those skilled in the art, having the benefit of this disclosure, will appreciate numerous modifications and variations therefrom. It is intended that the appended claims cover all such modifications and variations.

What is claimed is:

1. A method comprising:
    communicating with a plurality of input/output (I/O) modules to cause a firmware image to be transferred to the plurality of I/O modules, wherein each I/O module of the plurality of I/O modules is associated with a storage device enclosure of a plurality of storage device enclosures, and the plurality of I/O modules are serially coupled together in a chain establishing a processing order among the plurality of I/O modules; and
    rebooting the plurality of I/O modules to cause the plurality of I/O modules to use the communicated firmware images, wherein the rebooting comprises rebooting the plurality of I/O modules in a second order counter to the processing order, wherein the rebooting comprises communicating a reboot command to a given I/O module of the plurality of I/O modules while another I/O module of the plurality of I/O modules is rebooting.

2. The method of claim 1, wherein:
    the chain comprises a daisy chain;
    the daisy chain begins with a first I/O module of the plurality of I/O modules and ends with a second I/O module of the plurality of I/O modules; and
    rebooting the I/O modules comprises rebooting the plurality of I/O modules according to the second order such that the rebooting of the second I/O module is initiated before the rebooting of the first I/O module.

3. The method of claim 1, wherein:
    the processing order corresponds to a downstream sequential direction along the chain;
    the second order corresponds to an upstream sequential direction along the chain; and
    rebooting the plurality of I/O modules comprises communicating the reboot command to reboot a first I/O module of the plurality of I/O modules while a second I/O module of the plurality of I/O modules is rebooting.

4. The method of claim 1, wherein a first I/O module of the plurality of I/O modules is associated with a port identification (ID), the first I/O module is associated with a given storage device enclosure of the plurality of storage device enclosures, the given storage device enclosure comprises a plurality of storage devices, and the first I/O module comprises a port expander to communicate with a plurality of ports associated with the plurality of storage devices.

5. The method of claim 1, wherein communicating the firmware image to the plurality of I/O modules comprises communicating firmware image data through a port of a host bus adapter.

6. The method of claim 1, wherein:
    a first I/O module of the plurality of I/O modules corresponds to a first end of the chain and is coupled to a first port of a host bus adapter; and
    a second I/O module of the plurality of I/O modules corresponds to a second end of the chain and is coupled to a second port of the host bus adapter other than the first port.

7. The method of claim 1, wherein communicating with the plurality of I/O modules comprises communicating with hardware processors of the I/O modules.

8. The method of claim 7, wherein:
    communicating the firmware images and the rebooting occur in association with a computing node and the computing node determines whether an I/O module of the plurality of I/O modules is locked from firmware updates.

9. The method of claim 8, wherein the computing node is part of a cluster of high availability (HA) computing nodes.

10. The method of claim 1, wherein the plurality of I/O modules comprises port expanders.

11. The method of claim 1, wherein communicating the firmware image data to the plurality of I/O modules comprises communicating a write command to the plurality of I/O modules, wherein the write command causes the plurality of I/O modules to defer rebooting.

12. The method of claim 1, wherein:
    rebooting the plurality I/O modules comprises rebooting a first I/O module of the plurality of I/O modules; and
    rebooting of the first I/O module causes communication with a second I/O module of the plurality of I/O modules to be unavailable while the first I/O module is rebooting.

13. An apparatus comprising:
    at least one processor; and
    a memory to store instructions that, when executed by the at least processor, cause the at least one processor to:
        communicate with input/output (I/O) modules that are coupled together in a daisy chain to cause an updated firmware image to be transferred to the I/O modules and cause the I/O modules to defer rebooting to effect updating of firmware of the I/O modules, wherein the daisy chain establishes a first sequential ordering of the I/O modules; and
        sequentially reboot the I/O modules to effect updating of the firmware according to a second sequential ordering other than the first sequential ordering, wherein the sequential rebooting comprises the at least one processor communicating a reboot command to a given I/O module of the I/O modules while another I/O module of the I/O modules is rebooting.

14. The apparatus of claim 13, wherein the second sequential ordering is the reverse of the first sequential ordering.

15. The apparatus of claim 13, wherein the instructions, when executed by the at least one processor, further cause the at least one processor to sequentially reboot the I/O modules to cause a first I/O module of the I/O modules to reboot while the updated firmware image is being transferred to a second I/O module of the I/O modules.

16. The apparatus of claim 15, wherein the second I/O module is upstream of the first I/O module according to the first sequential ordering.

17. A machine readable storage medium to store instructions that, when executed by a machine, cause the machine to:

communicate with a chain of input/output (I/O) modules serially coupled together by storage link interconnects to cause the I/O modules to load data representing a firmware update for each of the I/O modules, wherein the chain of I/O modules comprises a first I/O module disposed at the beginning of the chain and associated with a first group of storage drives, and the chain of I/O modules comprises a second I/O module disposed downstream of the first I/O module and associated with a second group of storage drives; and communicate with the first and second I/O modules to reboot the first and second I/O modules to cause the first and second I/O modules to apply the firmware update, wherein communicating with the first and second I/O modules comprises causing the second I/O module to begin rebooting before the first I/O module and initiate rebooting of the first I/O module while the second I/O module is rebooting.

18. The machine readable storage medium of claim 17, wherein the instructions, when executed by the machine, further cause the machine to:

communicate with a given I/O module of the chain of I/O modules in association with a first initiator; and determine whether firmware of the given I/O module is being updated by a second initiator.

19. The machine readable storage medium of claim 18, wherein the first and second initiators are associated with a cluster of high availability (HA) servers.

20. The machine readable storage medium of claim 17, wherein the instructions, when executed by the machine, further cause the machine to reboot the chain of I/O modules in an order reverse to an order in which commands propagate through the chain.

* * * * *